United States Patent Office 3,497,454
Patented Feb. 24, 1970

3,497,454
FLAME RETARDANT
Carl F. Perizzolo, Richmond, Calif., assignor to Stauffer Chemical Company, New York, N.Y., a corporation of Delaware
No Drawing. Filed Apr. 25, 1966, Ser. No. 544,809
The portion of the term of the patent subsequent to Feb. 26, 1985, has been disclaimed and dedicated to the Public
Int. Cl. C09k 3/28
U.S. Cl. 252—8.1         8 Claims

ABSTRACT OF THE DISCLOSURE

An effective flame retardant composition for wood of phosphorus trichloride or phosphorus thiochloride with or without a binder resin for example, a vinylchloride-vinyl acetate copolymer, and an inert organic solvent therefor and a process for the preparation of flame retardant wood by applying to said wood or impregnating said wood with an effective flame retarding amount of said composition.

---

This invention relates to a durable flame retarding composition for wood. More specifically, the present invention is directed to providing an improved and effectively durable useful flame retardant to be used in conjunction with wood in order to impart thereto effective flame retarding characteristics.

Wood is very stable at ordinary temperatures. However, at elevated temperatures wood undergoes degradation and combustion. The degradation of wood at elevated temperatures is a process of decomposition of solid components thereof into volatile liquids and gases and is accompanied by a reduction in weight. Wood becomes more porous, less dense and more easily ignited as it undergoes thermal decomposition. Therefore, fire when controlled is an aid to mankind but when uncontrolled it is the natural enemy of wood. It is generally accepted that it is impossible to render wood indestructible by fire, but the prior art contains many treatments that will reduce or prevent flame propagation. Some treatments are more or less effective. The thermal decomposition of wood can be affected catalytically by the presence of some inorganic chemicals, such as, for example, compounds containing iron, copper and chromium ions. The more important consideration is the use of additive chemicals to produce a fire-retarding effect on wood. Some examples of known fire-retardant chemicals are ammonium phosphate, ammonium sulfate, ammonium chloride, zinc chloride, antimony chloride mixtures of borax and boric acid as well as various organic chemicals. These chemicals do not inhibit thermal decomposition of wood at elevated temperatures, but they do inhibit flaming combustion or glowing of the wood. Various theories have been presented on the flame retarding action of various known additives. The observation that added chemicals can change the direction of wood pyrolysis leads those in the field to search for new and effective fire-retarding treatment systems. A general nature of the fire-retardant chemicals impart to the wood resistance to ignition, to fire penetration and to the spread of flame over the wood surface.

In addition to flame retarding the wood, it is desirable to employ a treatment which is also durable after being exposed to rigorous weathering conditions. The treatment is to be durable in the sense that sufficient flame retarding material remains in the wood upon repeated exposure to water, heat and ultraviolet light to continue to satisfactorily flame retard the wood after a given length of time. Many systems have been proposed to accomplish this end but each has failed in one regard or another. Some treatments are prohibitive because of economics, destructive degradation of the wood cell structure, i.e., loss of material strength, leachable by-products, and the like.

A principal object of this invention is to provide an effective and durable flame retarding treatment for wood, wherein wood treated therewith will display fire retarding characteristics. Another object is provision of a process for carrying out said treatment on wood. Moreover, the invention affords development of an effective and durable fire retarding composition easily applicable to wood to render said wood less susceptible to destruction by fire.

Pursuant to the above-mentioned and yet further objects, it has been found surprisingly that wood treated with phosphorus trichloride or phosphorus thiochloride imparts to said treated wood certain desirable and durable flame-retarding properties. It has also been found that these effective and durable flame retarding properties of phosphorus trichloride or phosphorus thiochloride in wood may be extended favorably by the incorporation of a suitable binding resin therewith. Such a supplemental treatment protects the primary flame retarding agent, phosphorus trichloride or phosphorus thiochloride, against excessive leaching by water. However, it is not necessary to employ a binder resin herein as will become apparent from the remainder of the specification. Excellent durability results may be obtained from the use of phosphorus trichloride or phosphorus thiochloride alone.

There have been several processes which employ phosphorus oxychloride to impart flame retarding properties to essentially pure cellulosic material. However, wood as used in the present invention may be defined as an interpenetrating system of high polymers. The major component polymers comprising said system may be classified as cellulose, approximately one-half the wood weight, and lignin, approximately twenty to thirty percent of the wood tissue. Other components present in minor amounts in wood may be terpenes, proteins, aliphatic acids, sterols and various inorganic constituents. It should be noted in the description of wood that its composition is markedly nonuniform. Therefore, wood differs from pure cellulose in that it has present in addition to cellulose various other natural polymeric materials. In the prior art that describes the phosphorylation of cellulose utilizing phosphorus oxychloride, it was found necessary to employ an organic base such as pyridine, ammonia, ethylene diamine, urea and the like in order to obtain retention of the necessary phosphorus content. Within the embodiments of the present invention it is possible to achieve effective and durable fire retardant properties in wood by employing only a member selected from the group phosphorus trichloride, phosphorus thiochloride, phosphorus trichloride and a binder resin and phosphorus thiochloride and a binder resin.

In the treating solution used in the practice of the present invention an unreactive organic solvent is employed as a carrier for the phosphorus trichloride or phosphorus thiochloride and binding resin, if one is used. The use of a solvent aids in the penetration of the wood structure. The application of various concentrations of flame retardant in a suitable solvent is also a convenient means for control of the load desired in the wood. Any inert essentially anhydrous solvent such as kerosene, naphtha, benzene, hexane, butane, chlorine-containing solvents or other inert liquid which does not react with the fire retarding composition utilizing phosphorus trichloride or phosphorus thiochloride, may be employed. Carbon tetrachloride, methylene chloride, chloroform and the like all may serve as acceptable solvents. Sometimes it may be found advantageous to include in the treating solution a fungicide and/or bactercide to retard fermentation and the growth of fungi harmful to wood.

Employment of phosphorus trichloride or phosphorus thiochloride with wood in quantities which confer a desired beneficial flame retarding effect is dependent upon the effect desired. Whereas very low loadings of phosphorus trichloride or phosphorus thiochloride are operable as flame-retardants, the specific amount to provide a desired performance is readily determinable by those skilled in the art simply by visual observation or by use of conventional techniques. Hence, in order to arrive at an optimum beneficial effect suited to the purpose for which the wood is selected, only routine testing involving variation of the loading levels of phosphorus trichloride or phosphorus thiochloride is generally required.

In the treating composition an associative adjuvant may be used in cooperation with phosphorus trichloride or phosphorus thiochloride, wherein lesser amounts of phosphorus trichloride or phosphorus thiochloride are needed to impart effective and durable flame retarding characteristics to the treated wood. Said adjuvant may be any suitable binder resin possessing waterproofing characteristics, such as polyvinyl chloride, polyvinylidene chloride, vinyl chloride-vinyl acetate copolymer, vinyl chloride-vinylidene chloride copolymer, halogenated polyesters, halogenated epoxy resins, polystyrene, polyethylene, polybutenes, polymethylmethacrylate, aminealdehyde resins, epoxy resins, unsaturated polyesters, and the like. The preferred binding resin is vinyl chloride-vinyl acetate copolymer. Said resin may be any mixture of the two compounds which, after polymerization by any known or suitable method, such as heat or the action of ultraviolet light radiation, or by the action of a substance like benzoyl peroxide, may be taken up in a convenient organic solvent for application to the wood. The inventor does not wish to be limited to a specific resin composition, since any composition of copolymer may be found applicable.

Two general methods are available for applying flame retarding materials to wood. One is an application of coatings of non-combustible materials over the surface of the wood. The other is an impregnation process which deposits the chemicals within the wood structure. The coatings can be oil, resin or latex base preparations in which the fire-retarding chemical has been incorporated. The coatings may be of the intumescent type, that is, those which froth and swell at flame temperatures. The impregnation processes usually involve injecting chemicals in solution into the wood by pressure techniques in order to obtain predetermined absorptions. The compositions herein described may be incorporated into either of the application methods, although the preferred process is that of pressure impregnation.

In carrying out the preferred method of treating wood with the fire retarding compositions of the present invention, two general procedures for pressure impregnation of wood may be used. These will be referred to hereinafter as the empty cell and the full cell procedures, respectively.

In the empty cell procedure the wood is placed in a pressure vessel, commonly a horizontal cylinder, and moderate air pressure is applied. An impregnant solution is then forced into the cylinder and into the wood. Pressures of up to 100–150 pounds per square inch are used to force the impregnant solution deep into the wood. The pressure is then released and the unabsorbed solution is removed from the cylinder. A vacuum is then applied and the residual air in the capillaries of the wood expands, thereby forcing the excess liquid into the pores of the wood. The wood pores are in this way covered with a thin film of the impregnant.

In the full cell procedure a high vacuum is applied initially to the pressure vessel containing the wood. An impregnating solution is added to the cylinder and surrounds the wood while the vacuum is maintained. Positive pressure is then applied to force the impregnant into the wood. At the end of the impregnation the pressure is released. A final vacuum is applied and the unabsorbed solution is removed from the cylinder. Since the air in the pores of the wood was removed from the pores by the initial vacuum, a considerable amount of liquid now remains in the pores. However, the relatively small amount of air which was not removed from the pores by the initial vacuum dissolved in the solution during the pressure period. When the pressure is released, this dissolved air comes out of solution in the form of bubbles, causing the wood to weep. The application of the final vacuum prevents or minimizes weeping by rapidly removing the solution that would normally run out by the action of the expansion of the dissolved air.

If time is no object, it is unnecessary to use pressure and diffusion alone may be relied upon. Over a period of time wood immersed in an open tank of solution will have the air in the pores displaced by the liquid.

It must be recognized that the flame retarding composition containing phosphorus trichloride or phosphorus thiochloride and a binding resin may be applied to the wood in a two-stage, as well as a one-stage, combined-component system. In the normal practice of a two-stage treatment system any of the aforedescribed procedures are equally applicable, as well as combinations of the procedures. For example, the empty cell technique for introduction of phosphorus trichloride or phosphorus thiochloride followed by a full cell procedure for the binder resin. Various other modifications in combination or separately may be made within the pressure impregnating processes described above. For example, the full cell procedure may be modified to exclude the initial evacuation step. Likewise, the final evacuation step may be eliminated and the treated wood dried as soon as the pressure is released and the excess impregnant solution is removed.

Since the quantity of the flame retarding agent of the present invention which is employed with wood will vary with the fire-retarding effect sought, the utility of the wood, i.e., exterior or interior application, and the type and dimensions of the wood treated, it is evident that no rigid load limits can be set forth. For many purposes, particularly in large volume wood members, very low quantities on a weight to weight basis are satisfactory. Obviously deep penetration of the flame retardant composition into the interior of a large volume wood member is not necessary for satisfactory performance, since only the exterior portion and a limited depth thereof are susceptible to degradation and combustion. For other purposes, wherein the wood member has a rather small volume, loading levels may reach a high ratio of flame retarding agent to wood on a weight to weight basis. At the same time requirements of durability must be determined. Exterior exposure to severe weathering conditions will require higher load limits as compared to an interior utility. Determination of the optimum quantity for a specific flame retarding performance is readily conducted by routine procedures, as will be apparent to those skilled in the art.

Accelerated exposure tests were employed in the evaluation of phosphorus trichloride and phosphorus thiochloride as a durable flame retarding agent for wood within the embodiments of the present invention. It is known that most of the inorganic and organic fire-retardant chemicals described in the prior art also cause discoloration of the treated wood, rusting or other adverse deterioration of metal fastening means, are toxic to humans, or are easily removed by leaching, as by rain, from the wood and thereby are no longer effective as a fire-retardant. In order to shorten the time of exposure tests to study the present system, the use of artificial environments was adapted. Three durability tests were employed: an alternate rain and heat test wherein the samples were exposed to 3.5 days of "rain" equivalent to 12.5 inches per hour and 3.5 days of "sun" at 65° C. The "rain" exposure can be equated to the severe conditions of 525 inches of rain per year for approximately 24 years. This test was conducted for a total of up to 12 weeks; a heat test wherein the samples were kept at 80° C. for 90 days, and a weatherometer test consisting of 600 hours of exposure to "noon" sunlight, cooling, heating and moisture. The weatherometer test was run according to American Society for Testing Materials procedure type D test E42–57.

The herein described treatment for wood with phosphorus trichloride or phosphorus thiochloride, or phosphorus trichloride and a binder resin or phosphorus thiochloride and a binder resin does not display said undesirable characteristics as described, supra, before or after the durability tests. Therefore, wood treated with an application of phosphorus trichloride or phosphorus thiochloride and a binding resin, if one is employed, improves the resistance of the wood to ignition, to fire penetration and to the spread of flame over the wood surface without affecting the appearance of the wood, the metal fastening used therewith, endangering humans by exposure thereto, or rapid removal by adverse and severe weathering conditions.

The applicant does not fully understand the mechanism involved in the incorporation of the phosphorus trichloride or phosphorus thiochloride in wood and therefore does not wish to be limited to any specific mode of incorporation. However, it is thought that there is a reaction between the phosphorus trichloride or the phosphorus thiochloride and various constituents that go to make up the complex structure of wood. This is evidenced by the fact that the system of the present invention is operable as a durable permanent flame retarding agent for wood. Theoretically, a large number of possible chemical structural formulas can be drawn for reaction products of phosphorus trichloride or phosphorus thiochloride and various constituents of wood and it is highly probable that the reaction products in wood are mixtures of several different of these compounds having different structural formulas. Many of the previously proposed flame retardant systems are easily leached from wood, thereby suggesting non-reaction with the wood, but a loose absorptive incorporation. Therefore, these prior systems are non-durable to weathering conditions and the like.

The following examples illustrate the present invention as applied to wood.

EXAMPLE 1

This example illustrates the impregnation of a selected representative wood specie with a loading of phosphorus trichloride and binder resin sufficient to be effective both before and after exposure to severe weathering conditions.

Samples of red cedar, 4 in. x 6 in. by 5/16 in. were accurately weighed and used as the test specimen. The pieces of wood were placed in a pressure vessel. The impregnation technique used was a modified full cell procedure. The chamber was evacuated to a vacuum of about 15 to 20 inches for approximately 30 minutes. A solution of 3.7% phosphorus trichloride: 10% vinyl chloride-vinyl acetate (87:13) copolymer in methylene chloride as solvent was introduced into the pressure vessel sufficient to fill the pressure chamber containing the wood specimen. Hydrostatic pressure of approximately 90 pounds per square inch was then applied to the liquid in the pressure vessel until the wood samples no longer absorbed the liquid. The pressure was then released and the unabsorbed solution was removed from the chamber. The entire process was carried out at room temperature. The wood specimens were dried to constant weight at 65° C. in an oven. The total solids absorbed was equivalent to 11.74 lbs. per 100 lbs. of wood, after drying. This is equal to 3.17 lbs. of $PCl_3$; analysis indicated 0.72% phosphorus in 100 lbs. of wood.

Prior to testing the durability of the system in wood the wood samples were exposed to a gas/air flame 1¼ inches by 6½ inches of approximately 1300° F. An external air supply equivalent to a 12 mile-per-hour wind was superimposed on the test flame and wood samples. The sample pieces of wood were arranged in a 3-member deck simulating a roof structure. Wood samples were exposed for four minutes and for three cycles comprising 1 minute flame exposure and 2 minutes rest. Once the samples passed these flame exposure tests satisfactorily they were subjected to the following durability tests.

Various sets of wood samples thus treated were subjected to accelerated durability tests before exposure to flame. The rain/heat test consisted of alternate exposure over a 12 week period to 3.5 days of "rain" at 12.5 inches/hour and 3.5 days of heat at 65° C. The severe heat test consisted of 90 days exposure to a temperature of 80° C. The weatherometer test consisted of a 600-hour exposure to alternating cycles of 18 minutes of spray and 102 minutes of arc. The temperature during the arcing cycle was 145° F. The wood samples subjected to the durability tests were then exposed to the above-described intermittent gas/air flame test.

Observations were made such as the spread of the flame beyond area of flame impingement, afterglow on removal of the flame, structural strength of the specimen, and the like. There was essentially no flame spread, no afterglow or at best several small glow areas which were short-lived and the specimen did not disintegrate or become substantially weakened after flame removal. The wood samples treated with phosphorus trichloride as described did exhibit flame retardant characterictics in all phases of the testing procedure.

EXAMPLE 2

This example illustrates a typical loading of phosphorus trichloride sufficient for most interior, non-weathering applications.

In the same manner as Example 1, samples of red cedar, 4 in. x 6 in. x 5/16 in., were accurately weighed and used as the test specimen. Using the modified full cell procedure wood samples were impregnated in two different applications with phosphorus trichloride to a weight increase of approximately 3.45 pounds per 100 pounds of wood and 2.83 pounds per 100 pounds of wood, respectively.

These samples were not subjected to the durability tests of Example 1. However, they were exposed to the gas/air flame at a temperature of approximately 1300° F. with the superimposed air source equivalent to a 13 mile-per-hour wind. The wood samples were arranged in a 3-member deck as previously described and exposed for four minutes to the test flame and also for three cyles of the alternate exposure-rest flame test.

The wood samples thus treated and exposed to the test flame had excellent flame retardant characteristics at both levels. These characteristics were exemplified by no flame spread beyond the area of flame impingement, retained structural strength of the specimen and little or no afterglow on removal of the flame.

EXAMPLE 3

This example illustrates the use of phosphorus thiochloride as an effective flame retardant.

In the same manner as Example 1, samples of red cedar, 4 in. x 6 in. x 5/16 in., were accurately weighed and used as representative test specimen. Using the modified full cell procedure the wood samples were impregnated with a loading of phosphorus thiochloride. The impregnant solution was 2% phosphorus thiochloride in methylene chloride. The loading obtained was equivalent to 8.76 pounds of phosphorus thiochloride per 100 pounds of wood.

The wood samples thus treated were arranged in the usual 3-membered deck simulating a roof structure and subjected to the gas/air flame at a temperature of approximately 1200° F. with a superimposed air source equivalent to a 13 mile-per-hour wind. The treated wood samples were exposed for three cycles comprising 1 minute of flame exposure and 2 minutes of rest. It was observed that the decks did not burn. There was no flame spread beyond the immediate area of flame impingement and there was no afterglow after removal of the flame. Therefore, the wood samples were considered to have exhibited favorable flame retarding characteristics when treated with phosphorus thiochloride.

From these tests it can be seen that the degree of permanency of the flame retardant effect of the compositions of the present invention on wood is dependent upon the amount of the phosphorus compound retained by the wood after exposure to the severe accelerated weathering conditions. Therefore the degree of permanency or durability required is a function of the flame retarding performance desired under given conditions. As can be seen from the above examples, lower phosphorus trichloride or phosphorus thiochloride loads may be sufficient for an interior non-weather exposed application. At the same time the lower loading may be combined with a suitable binder resin or waterproofing composition which diminishes leaching of the phosphorus compound by water and thereby become adequately satisfactory for various exterior weatherable applications.

Wood samples treated in accordance with the present invention were found to retain their original natural wood color, exhibit no evidence of degradation, exhibit no excessive corrosion of metal fastening means either before or after weathering tests, retain their structural strength, no warping was evident because of the treatment and the wood samples were not hygroscopic beyond normal moisture absorption from the atmosphere.

Various changes and modifications may be made without departing from the spirit and scope of the invention described herein as will be apparent to those skilled in the art to which it pertains. It is accordingly intended that the present invention shall only be limited by he scope of the appended claims.

I claim:
1. An effective flame retardant composition for wood consisting of a member selected from the group consisting of phosphorus trichloride and phosphorus thiochloride, a binder resin, and an inert organic solvent therefor.
2. An effective flame retardant composition for wood according to claim 1 wherein said binder resin is vinyl chloride-vinyl acetate copolymer.
3. A process for the preparation of flame retardant wood consisting of applying to said wood an effective flame-retarding amount of a member selected from the group consisting of phosphorus trichloride and phosphorus thiochloride.
4. A process for the preparation of flame retardant wood consisting of applying to said wood an effective flame-retarding amount of a solution of a member selected from the group consisting of phosphorus trichloride and phosphorus thiochloride, and a binder resin.
5. A process for the preparation of flame retardant wood according to claim 4 wherein said binder resin is vinyl chloride-vinyl acetate copolymer.
6. A process for the preparation of flame retardant wood consisting of impregnating said wood with an effective flame-retarding amount of a member selected from the group consisting of phosphorus trichloride and phosphorus thiochloride.
7. A process for the preparation of flame retardant wood consisting of impregnating said wood with an effective flame-retarding amount of a member selected from the group consisting of phosphorus trichloride and phosphorus thiochloride, and a binder resin.
8. A process for the preparation of flame retardant wood according to claim 7 wherein said binder resin is vinyl chloride-vinyl acetate copolymer.

References Cited
UNITED STATES PATENTS

| 3,081,293 | 3/1963 | Doughty | 260—124 |
| 3,371,058 | 2/1968 | Perizzolo | 260—29.1 |

OTHER REFERENCES

Remy, H., Treatise on Inorganic Chemistry, Elsevier Publishing Co., p. 645 (1964).

JOSEPH L. SCHOFER, Primary Examiner

C. A. HENDERSON, Jr. Assistant Examiner

U.S. Cl. X.R.

117—138, 137; 106—15; 260—29.1, 87.1